United States Patent
Schackmann

(10) Patent No.: US 11,760,902 B2
(45) Date of Patent: Sep. 19, 2023

(54) DECORATIVE AND PROTECTIVE COATING COMPOSITION FOR METAL, GLASS AND PLASTICS SUBSTRATES

(71) Applicant: EPG-F S.A.R.L., Henriville (FR)

(72) Inventor: Billy Schackmann, Forbach (FR)

(73) Assignee: EPG-F S.A.R.L., Henriville (FR)

( * ) Notice: Subject to any disclaimer, the term of this patent is extended or adjusted under 35 U.S.C. 154(b) by 0 days.

(21) Appl. No.: 17/904,488

(22) PCT Filed: Feb. 18, 2021

(86) PCT No.: PCT/EP2021/053958
§ 371 (c)(1),
(2) Date: Aug. 18, 2022

(87) PCT Pub. No.: WO2021/165356
PCT Pub. Date: Aug. 26, 2021

(65) Prior Publication Data
US 2023/0103892 A1     Apr. 6, 2023

(30) Foreign Application Priority Data
Feb. 20, 2020  (EP) .................................... 20305165

(51) Int. Cl.
*C09D 183/08*  (2006.01)
*C09D 7/61*    (2018.01)
*C09D 7/20*    (2018.01)
*C09D 175/06*  (2006.01)

(52) U.S. Cl.
CPC ............. *C09D 183/08* (2013.01); *C09D 7/20* (2018.01); *C09D 7/61* (2018.01); *C09D 175/06* (2013.01)

(58) Field of Classification Search
CPC .. C08G 18/837; C08G 18/838; C09D 175/06; C09D 183/08
See application file for complete search history.

(56) References Cited

U.S. PATENT DOCUMENTS

| | | | |
|---|---|---|---|
| 5,238,708 A | 8/1993 | Blizzard | |
| 2005/0244658 A1 | 11/2005 | Bae et al. | |
| 2007/0134503 A1* | 6/2007 | Espinosa | C23C 22/83 106/287.19 |
| 2009/0008613 A1* | 1/2009 | Nennemann | C08G 18/8061 252/589 |
| 2012/0010314 A1* | 1/2012 | Charpentier | C08G 18/838 521/157 |
| 2016/0340466 A1* | 11/2016 | Hamajima | D06M 15/653 |
| 2022/0363900 A1* | 11/2022 | Sanz | C09D 183/08 |

FOREIGN PATENT DOCUMENTS

| | | | | |
|---|---|---|---|---|
| CN | 107418420 A | * | 12/2017 | ........ C09D 175/06 |
| EP | 1713869 A1 | | 10/2006 | |
| FR | 2 866 029 A1 | | 8/2005 | |
| JP | 2010095673 A | | 4/2010 | |
| WO | 2010062436 A1 | | 6/2010 | |

OTHER PUBLICATIONS

International Search Report in International Application No. PCT/EP2021/053958, dated Apr. 12, 2021.

* cited by examiner

*Primary Examiner* — Michael M Dollinger
(74) *Attorney, Agent, or Firm* — RAPHAEL BELLUM PLLC

(57) ABSTRACT

I. an inorganic-organic hybrid material obtained from A1. one or more partially hydrolysed alkoxysilanes of the formula (Ia), $(R^1O)_nSiR^2{}_{3-n}R^3$ (Ia) A2. optionally one or more partially hydrolysed alkoxysilanes of the formula (Ib), $(R^4O)_nSiR^5{}_{4-n}$ (Ib) B1. one or more metal alkoxides of the formula (IIa), $Ti(OR^6)_4$ (IIa) B2. optionally one or more metal alkoxides of the formula (IIb), $M^{+(4-m)}(OR^7)_{4-m}$ (IIb) wherein the symbols and indices have the definitions specified in the description and wherein the molar ratio of Si in components A1 and A2 to Ti in component B1 is 1-20:1; C. one or more oligomeric or polymeric polyols; D. one or more blocked, optionally modified polyisocyanates; and E. optionally one or more monomers, oligomers and/or polymers which have one or more free epoxy groups; II. optionally one or more colorants and III. optionally one or more adjuvants, is suitable especially for the decorative and protective coating of metal, glass and plastics substrates.

21 Claims, No Drawings

DECORATIVE AND PROTECTIVE COATING COMPOSITION FOR METAL, GLASS AND PLASTICS SUBSTRATES

The invention relates to an inorganic-organic coating composition, especially for metal, glass and plastics substrates, to methods for coating substrates with the coating composition of the invention, and also to substrates coated with the coating composition of the invention.

In accordance with the prior art, various methods are nowadays used for producing decorative and/or protective surfaces for metal, glass and plastics substrates, such as powder coatings and, in particular for aluminium materials, anodic layers.

Powder coatings generally require a plurality of pretreatment steps. In addition to the removal of surface residues (paints, greases), these steps also include the cleaning and application of multiple conversion coats. The purpose of these coats is to achieve a better match between the surface and the paint. Cleaning products based on ethanol or acetone which evaporate at room temperature and leave no residues behind on the surface are used for the cleaning. Certain basic materials require pretreatment for corrosion control. Inadequate surface preparation may lead to a reduction in the adhesion or even to spontaneous detachment or to craters in the paint film. Typical processes in the powder coating sector are phosphatizing on steel, colouring on galvanized steel, chromatizing and also anodizing, or anodizing on aluminium. The powder coating layers produced generally have layer thicknesses of between 60 and 120 µm. Depending on application and surface properties, the layer thickness may also be above or below this range.

The sometimes complex pretreatment steps are costly and ought therefore to be avoided. There is a risk, however, of adhesion losses occurring if the pretreatment is not properly carried out and if consequently there are rejects. Other disadvantages of powder coatings in the functional decorative sector are the relatively high layer thicknesses, which may result in a plastic-like appearance and may influence the tactile qualities. Moreover, powder coatings for certain areas of application have inadequate chemical resistance and corrosion resistance and also inadequate scratch and abrasion resistance.

A process frequently used to obtain coloured surfaces on aluminium and its alloys is the anodizing process. Various kinds of anodized layers are known, depending on production conditions and aluminium alloys. Technical anodized coatings are produced at room temperature with current densities of 1.5 A/dm2 in a sulfuric acid electrolyte. Anodized surfaces are transparent and protect the aluminium to a certain degree from corrosion and scratches, by comparison with untreated surfaces. Hard-anodized layers are produced at temperatures around 0° C. with higher current densities of 2-5 A/dm2 in mixed sulfuric acid electrolytes. In comparison to technical anodizing, they are distinguished by particularly enhanced abrasion and scratch resistance. A third technique is the Glossel anodizing technique. In this case the metal is polished by electropolishing prior to the technical anodizing, and is then anodized in a sulfuric acid electrolyte. Anodized layers have a porous structure; dyes or other substances may optionally be embedded into these pores. The openings of the pores can be closed by compressing in hot water. Here, aluminium oxide hydrate (boehmite) is formed in the pore. Anodizing improves the corrosion resistance by comparison with the bright aluminium, but a drawback of the anodized layers is the lack of pH stability (between pH 4 and 9). At pH values outside this range, of course, either the bright aluminium or the anodized layer must be protected by an overlying layer. There are various methods that are used to obtain coloured anodized aluminium.

In the case of colouring with organic dyes, the aluminium after anodizing is immersed in hot dye solution and then rinsed off. With colouring by this technique, the dye molecules accumulate predominantly in the upper regions of the pores of the anodized layer, and form bonds with the oxide layer. The greater the amount of dye in the solution, the greater the extent to which they accumulate in the oxide layer. In the case of inorganic dyes, after anodizing, the aluminium is neutralized, rinsed and dyed in paint baths with metal salt solutions. The ions of the solution accumulate in the pores of the anodized layer and become a solid.

Electrolytic colouring takes place with alternating voltage. The electrolyte comprises a colouring metal salt. The duration of the electrolysis depends on the desired depth of colour. The metal ions penetrate deeply into the pores of the layer. The pores with a partial filling of metal then give rise to light-affected colouration as a result of absorption and scattering effects.

In the case of decorative coloured aluminium elements, the anodizing process is confined to a certain number of colours, and a major drawback is that not all types of aluminium can be coloured by this method, and that the aforementioned methods usually do not result in an even coloration. Moreover, not all aluminium alloys and semi-finished products can be coloured using these costly and inconvenient methods.

In order to avoid these problems with the known methods, the same methods being still predominantly in use today, proposals have already been made for the use of hybrid, i.e. inorganic-organic sol-gel materials.

German laid-open specification DE 10 2007 003761 A1 discloses materials and methods for the coating of substrates with heterogeneous surface properties, using epoxide-functionalized or isocyanate-functionalized alkoxysilanes.

DE 43 38 361 A1 discloses a method for producing compositions based on silanes containing epoxide groups. The coating compositions disclosed necessarily include nanoparticles.

DE 10 2012 022731 discloses highly abrasion-resistant anti-lime layers with high chemical resistance.

DE 10 2013 017217 A1 discloses coated optical mouldings.

WO 2017/067666 discloses a method for producing a coated light-metal substrate, more particularly aluminium substrate, comprising the steps of a) wet-chemically applying a coating composition to the light-metal substrate and b) thermally curing the coating material, where the coating composition comprises a sol-gel material with the necessary addition of complexing agents from the group of the 1,3-dicarbonyl compounds.

Despite good results having already been achieved with the known systems, there nevertheless remains room for improvements in terms of the diverse requirements made of such coating systems:

The coating systems and methods for producing coatings available must be suitable for creating decorative surfaces, in order to replace powder coatings and, particularly for aluminium and its alloys, anodic layers. They ought to make it possible for application to take place without pretreatment layers or priming coats, and they ought to be suitable for masking traces of pretreatment operations such as sanding or "trovalizing". For specific application, the materials ought to be stable with respect to hand perspiration and UV radiation and ought to have high scratch and abrasion stability. There ought also to be high corrosion resistance; a broad palette of colours ought to be accessible, with the above-specified properties retained and with a high colour homogeneity being necessarily ensured.

It has now surprisingly been found that the stated requirements are met to a high degree by a coating composition which comprises a specific inorganic-organic hybrid material comprising at least one titanium alkoxide.

A subject of the invention is therefore a coating composition comprising
I. an inorganic-organic hybrid material obtained from
A1. one or more partially hydrolysed alkoxysilanes of the formula (Ia), $$(R^1O)_n SiR^2_{3-n} R^3 \quad (Ia)$$

where the symbols and indices have the following definitions:
$R^1$ is $C_1$-$C_6$ alkyl or $C_1$-$C_{10}$ aryl,
$R^2$ is $C_1$-$C_4$ alkyl, $C_2$-$C_4$ alkenyl or $C_2$-$C_4$-alkynyl, $C_6$-$C_{10}$ aryl, $C_6$-$C_{10}$ aralkyl or $C_6$-$C_{10}$ alkaryl,
$R^3$ is an epoxy-functional group and
n is 1, 2 or 3;
A2. optionally one or more partially hydrolysed alkoxysilanes of the formula (Ib), $$(R^4O)_n SiR^5_{4-n} \quad (Ib)$$

where the symbols and indices have the following definitions:
$R^4$ is $C_1$-$C_6$ alkyl or $C_6$-$C_{10}$ aryl,
$R^5$ is $C_1$-$C_{10}$ alkyl, $C_2$-$C_4$ alkenyl or $C_2$-$C_4$ alkynyl, $C_6$-$C_{10}$ aryl, $C_6$-$C_{10}$ aralkyl or $C_6$-$C_{10}$ alkaryl, the stated radicals being optionally substituted by one or more, preferably one, amino group(s), and
n is 1, 2, 3 or 4;
B1. one or more metal alkoxides of the formula (IIa), $$Ti(OR^6)_4 \quad (IIa)$$

where the symbols have the following definitions:
$R^6$ is $C_1$-$C_6$ alkyl or $C_6$-$C_{10}$ aryl;
B2. optionally one or more metal alkoxides of the formula (IIb), $$M^{+(4-m)}(OR^7)_{4-m} \quad (IIb)$$

where the symbols and indices have the following definitions:
M is a metal from main or transition group 3 or 4 with EN<1.5 except for Ti,
$R^7$ is $C_1$-$C_6$ alkyl, or $C_6$-$C_{10}$ aryl and
m is 0 or 1, preferably 1,
where the molar ratio of Si in component A1 and A2 to Ti in component 1 is 1-20:1;
C. one or more oligomeric or polymeric polyols;
D. one or more blocked, optionally modified polyisocyanates; and
E. optionally one or more monomers, oligomers and/or polymers which have one or more, preferably at least two, free epoxy groups;
II. optionally one or more colorants and
III. optionally one or more adjuvants.

A further subject of the invention is a method for producing a coated substrate, comprising the steps of
a) wet-chemically applying the coating composition of the invention to the substrate and
b) thermally curing the coating composition.

A further subject of the invention is the use of the coating composition of the invention for coating substrates, preferably metal, glass and plastics substrates, more preferably light-metal substrates, more particularly aluminium substrates.

Likewise a subject of the invention is a substrate, preferably a metal, glass and plastics substrate, more preferably a light-metal substrate, more particularly an aluminium substrate, coated with a coating composition of the invention.

The coated substrates produced using the coating composition of the invention, especially decorative metal, plastics and glass substrates, combine an outstanding visual appearance with very good corrosion resistance, UV stability and scratch resistance.

Through the use of the titanium component it is possible to achieve a high hydrolysis rate of the alkoxysilane (in comparison to the use of Al alkoxides, for example). Because of the tetravalency of the titanium in comparison to the trivalency of aluminium, a higher densification can be achieved in the end product. Another effect of using the titanium compound is a lower water content after the reaction and a low haze in the coating.

The invention therefore expands the possibilities of avoiding or replacing the costly anodizing process, the use of alternative alloys, and the use of milled, cast, di-cast and sheet materials. The coating materials of the invention are notable, furthermore, for improved process stability.

In the invention it is possible in particular to obtain coatings which are distinguished by the following profile of properties:
adhesion: cross-cut (DIN EN ISO 2409) GT: 0;
adhesion after boil test: (dwell time 2 h in boiling DIN water) GT: 1;
corrosion resistance: NSS-Test (DIN EN ISO 9227) 240 h;
UV weathering:
SUN test, interior (DIN EN ISO 4892-2 Method B6) 250 h;
SUN test, exterior (DIN EN ISO 4892-2 Method A2) 500 h;
abrasion resistance:
abrasion testing (DIN EN ISO 60068-2-70) 50 000 cycles<20 mm²;
hand perspiration test 40 000 cycles;
Crockmeter Test with 20 000 and 50 000 cycles with cotton cloth successful (without loss of gloss or colour change);
surface hardness:
scratch resistance (DIN EN ISO 1518): 8 to 10 N.

The coating composition of the invention, as well as I. an inorganic-organic hybrid material, II. optionally one or more colorants and III. optionally one or more adjuvants, further comprises diluent, which is composed of the fraction of alcohol(s) resulting from synthesis and originating from the partial hydrolysis, and also, optionally, of one or more further diluents. The coating composition of the invention preferably consists of components I to III and also diluent which, as well as the fraction of alcohol(s) resulting from the synthesis and originating from the partial hydrolysis, optionally comprises one or more further diluents.

The inorganic-organic hybrid material is a block prepolymer which is produced in situ and is formed from the condensation of hydrolysable alkoxysilanes. It is obtained from components A1. one or more partially hydrolysed alkoxysilanes of the formula (Ia), A2. optionally one or more partially hydrolysed alkoxysilanes of the formula (Ib), B1. one or metal alkoxides of the formula (IIa), B2. optionally one or more metal alkoxides of the formula (IIb), C. one or more oligomeric or polymeric polyols, D. one or more blocked, optionally modified polyisocyanates, and E. optionally one or more monomers, oligomers and/or polymers which have one or more, preferably at least two, free epoxy groups.

Component A1

In the formula (Ia) of the partially hydrolysed alkoxysilane, the symbols and indices preferably have the following definitions:

$R^1$ is preferably methyl, ethyl, propyl or butyl, with the latter two groups being unbranched or branched, preferably unbranched, more preferably methyl or ethyl.

n is preferably 2 or 3, preferably 3.

$R^2$ is preferably $C_1$-$C_4$ alkyl, more particularly methyl or ethyl.

$R^3$ is preferably an epoxy alkyl group whose alkyl group may be interrupted by one or more heteroatoms, such as oxygen or nitrogen. The alkyl group may also be substituted by one or more substituents, such as hydroxyl, amino, carboxyl or aryl, for example. The alkyl group may be linear, branched and/or cyclic. Preferred alkyl groups contain 1 to 20, particularly 1 to 10 carbon atoms outside the oxirane ring. More preferably the alkyl group is interrupted by an oxygen atom. A particularly preferred epoxy-functional group is the glycidyloxypropyl group.

Examples of suitable epoxy-modified alkoxysilanes include 3-glycidyloxypropyltrimethoxysilane, 3-glycidyloxypropyltriethoxysilane, 3,4-epoxybutyltrimethoxysilane, 3,4-epoxybutyltriethoxysilane, 2-(3,4-epoxycyclohexyl)ethyltrimethoxysilane, 2-(3,4-epoxy-cyclohexyl)ethyltriethoxysilane, 3-glycidyloxypropyldimethylethoxysilane, 3-glycidyloxy-propyldimethylmethoxysilane, 3-glycidyloxypropylmethyldiethoxysilane and 3-glycidyl-oxypropylmethyldimethoxysilane.

"Partially hydrolysed" in the context of the invention denotes a ratio of the unhydrolysed group to hydrolysed groups (ROR ratio) of 0.33 to 0.8.

Preferred molar ratios for the partial hydrolysis are as follows: silane of the general formula (Ia) to water in general 7.5:1-1:1.5, preferably 5: 1-1:1, more preferably the ratio is 1:1.

The partial hydrolysis may be carried out with acidic or basic catalysis or in a neutral medium. Preference is given to acidic catalysis, in which case one or more acids are used, examples being hydrochloric acid, sulfuric acid, phosphoric acid, nitric acid and organic acids such as acetic acid. In one preferred embodiment the partial hydrolysis is carried out at least partially with phosphoric acid. Coatings produced therewith are notable for high corrosion resistance and a material without discoloration and blisters.

The epoxy-functionalized group is not hydrolysed under the conditions of the partial hydrolysis of the functionalized alkoxysilanes.

Component A1 comprises one or more, preferably 1, 2 or 3, or 1 or 2, more particularly 1, alkoxysilane(s) of the formula (Ia).

Component A2

The hybrid material comprises, as component A2, optionally one or more alkoxysilanes of the formula (Ib). In one preferred embodiment the hybrid material comprises 1, 2, 3, 4 or 5, more preferably 1 to 4, alkoxysilanes of the formula (Ib). In another preferred embodiment the hybrid material comprises no (0) alkoxysilane of the formula (Ib).

The symbols and indices in the formula (Ib) preferably have the following definitions:

$R^4$ is preferably methyl, ethyl, propyl or butyl, with the latter two groups being unbranched or branched, preferably unbranched, more preferably methyl or ethyl.

$R^5$ is $C_1$-$C_3$ alkyl, $C_6$-$C_{10}$ aryl, $C_6$-$C_{10}$ aralkyl or $C_6$-$C_{10}$ alkaryl, the stated radicals being optionally substituted by one or more, preferably one, amino group(s).

n is preferably 3 or 4.

$R^4$ is more preferably methyl or ethyl.

$R^5$ is more preferably methyl, hexyl, phenyl or 3-aminopropyl.

n is more preferably 3 or 4.

Especially preferred alkoxysilanes of the formula (Ib) are tetraethoxysilane, methyltriethoxysilane, hexyltriethoxysilane, phenyltriethoxysilane and 3-aminopropyltriethoxysilane.

If alkoxysilanes of the formula (Ib) are used, they are present in a mixture with the alkoxysilanes of the formula (Ia), and so, in respect of the partial hydrolysis, the statements made in relation to component A1 are valid. The molar ratios specified above refer in this case to the sum total of the alkoxysilanes of the formulae (Ia) and (Ib).

By adding alkoxysilanes of component A2 it is possible advantageously to increase the inorganic fraction in the coating composition of the invention. The use of compounds such as hexyltriethoxysilane and phenyltriethoxysilane leads to an increase in the hydrophobicity, an improved corrosion control and also, in the latter case, an enhanced UV stability.

Component B1

Component 1 of the hybrid material of the invention comprises one or more titanium alkoxides of the formula (IIa),

$$Ti(OR^6)_4 \quad (IIa),$$

where $R^6$ is $C_1$-$C_6$ alkyl or $C_6$-$C_{10}$ aryl.

$R^6$ is preferably $C_1$-$C_6$ alkyl, more preferably n-butyl.

The molar ratio of Si in components A1 and A2 to Ti in component 1 is from 1-20:1, preferably 3-10:1, more preferably 4-8:1, very preferably from 4.5-5.5:1.

Using titanium alkoxides in component 1 has the distinct effect, for example, that the alkoxide can be added to the system without further stabilizing ligands. Ligands which have a stabilizing effect on the metal alkoxides are known; here, generally, chelate-forming ligands are employed. A particular advantage of the invention, however, is that there is no need for any stabilizers, and in particular no chelating agents, to be added to the coating composition.

In one preferred embodiment, therefore, the coating composition of the invention comprises no complexing agents to stabilize the metal alkoxides of the formulae (IIa) and (IIb), more preferably no chelating agents, especially preferably no 1,3-dicarbonyl compounds.

If complexing agents with a stabilizing effect on the metal alkoxides are to be added nevertheless, suitability is possessed in particular by 1,3-dicarbonyl compounds, e.g. β-diketones, and β-keto esters. Examples are ethyl acetoacetate, allyl acetoacetate, methacryloyloxyethyl acetoacetate, 3-acetyl-6-trimethoxysilylhexan-2-one, 2,2,6,6-tetramethyl-3,5-heptanedione, methyl butyloylacetate, ethyl benzoylacetate. Preferred complexing agents are β-diketones and β-keto esters, more preferably acetylacetone (pentane-2,4-dione) and ethyl acetoacetate (ethyl 3-oxobutyrate), especially ethyl acetoacetate.

Having proven preferable as molar ratios of metal alkoxide of the formula (IIa) and optionally (IIb) to complexing agent are ratios of 0.9:1.1 and very preferably 1:1. If desired, the metal alkoxide complex may be prepared preferably at low temperatures between −10° C. and 0° C., more preferably at temperatures of 0° C. in an ice bath. The complexing agent is added, preferably in the absence of air, to the initial charge of metal alkoxide. This is followed preferably by stirring, preferably for between 8 and 48 hours, with 24 hours being particularly preferred.

Component B2

The hybrid material optionally comprises, as component B2, one or more metal alkoxides of the formula (IIb).

In one preferred embodiment the hybrid material comprises one or more, preferably 1, 2 or 3, more preferably 1 or 2 metal alkoxides of the formula (IIb). In another preferred embodiment the hybrid material contains no (0) metal alkoxide of the formula (IIb).

Suitable metals M in the formula (IIb) are metals having an electronegativity<1.5 (according to Pauling) from main and transition groups 3 and 4 of the Periodic Table of the chemical elements, except for Ti; preferably Al, Zr and B. Particularly preferred is Al.

In the formula (IIb), n is 0 or 1, preferably 1. X is preferably a group $OR^7$. $OR^7$ is preferably $C_{1-6}$ alkoxy or $C_{6-10}$ aryloxy. Preferred groups $OR^7$ are methoxy, ethoxy, propoxy and butoxy. Particularly preferred are ethoxy and sec-butoxy.

Particularly preferred compounds of the formula (IIb) are aluminium alkoxides, more particularly aluminium tri-sec-butoxide (aluminium tri-sec-butylate, aluminium tri-sec-butanolate).

If the hybrid material comprises a metal alkoxide of the formula (IIb), the molar ratio of Ti in component 1 to metal alkoxide B2 is at least 1:1.

Regarding the addition of complexing agents to the metal alkoxides in component B2, the statements made in relation to component 1 are valid analogously, meaning that the coating composition of the invention preferably contains no stabilizing complexing agents, more preferably no chelating agents, especially preferably no 1,3-dicarbonyl compounds.

Component C

Suitability as component C is possessed by oligomeric or polymeric polyols, examples being polyvinyl alcohols (available for example under the Mowiol® brands) or other oligomers or polymers which have free OH groups, such as polyesters and polyethers with OH groups, or else polyacrylates with diols or polyols as the alcohol component.

As component C it is possible with preference to use polyester polyols, polyether polyols, polyether ester polyols, polycarbonate polyols, polyethercarbonate polyols, polybutadiene derivates, polysiloxane-based derivatives, and mixtures thereof, of the kind known in part from the preparation of polyurethanes.

Suitable polyester polyols may be polycondensates of diols and also optionally triols and tetraols and of dicarboxylic and also optionally tricarboxylic and tetracarboxylic acids or hydroxycarboxylic acids or lactones. In place of the free polycarboxylic acids it is also possible to use the corresponding polycarboxylic anhydrides or corresponding polycarboxylic esters of lower alcohols for preparing the polyesters.

Polyester polyols are prepared in a conventional way by polycondensation from aliphatic and/or aromatic polycarboxylic acids having 4 to 16 carbon atoms, optionally from their anhydrides, and also optionally from their low molecular mass esters, including ring esters, with low molecular mass polyols having 2 to 12 carbon atoms being used predominantly as a reaction component. Examples of suitable alcohols in this context are ethylene glycol, butylene glycol, diethylene glycol, triethylene glycol, polyalkylene glycols such as polyethylene glycol, and also 1,2-propanediol, 1,3-propanediol, butane-1,3 diol, butane-1,4 diol, hexane-1,6 diol and isomers, neopentyl glycol or neopentyl glycol hydroxypivalate or mixtures thereof, with preference being given to hexane-1,6 diol and isomers, butane-1,4 diol, neopentyl glycol and neopentyl glycol hydroxypivalate. In addition it is also possible to use polyols such as trimethylolpropane, glycerol, erythritol, pentaerythritol, trimethyloylbenzene or trishydroxyethyl isocyanurate or mixtures thereof. Particular preference is given to using diols, very preferably butane-1,4 diol and hexane-1,6 diol, very preferably hexane-1,6 diol.

As dicarboxylic acids in this context it is possible to use, for example, phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid and/or 2,2-dimethylsuccinic acid. The corresponding anhydrides may also be used as an acid source.

It is also possible, additionally, for monocarboxylic acids to be used as well, such as benzoic acid and hexanecarboxylic acid.

Suitable compounds are sold for example by Covestro under the Desmophen® brands. Preference is given especially to Desmophen® D651 MDA/X, a branched polyester polyol from Covestro. Additionally preferred is Desmophen® 1380 BT, a trifunctional polypropylene ether polyol from Covestro.

The amount of component C, based on the overall coating composition, is generally 5-25 wt %.

In the preparation of the coating composition of the invention, the oligomers or polymers are used in general in a diluent, examples being one or more solvents such as alcohols, glycols, esters and/or aromatic solvents. Preferred examples are glycol monoether acetates such as propylene glycol monomethyl ether acetate (PGMEA, 1-methoxy-2-propyl acetate).

Component D

Suitable as component D in the invention are blocked polyisocyanates based on, for example, butylene 1,4-diisocyanate, hexamethylene 1,6-diisocyanate (HDI), isophorone diisocyanate (IPDI), 2,2,4 and/or 2,4,4-trimethylhexamethylene diisocyanate, the isomeric bis(4,4'-isocyanatocyclohexyl)methanes (H12-MDI) or mixtures thereof with any desired isomer content, cyclohexylene 1,4-diisocyanate, 4-isocyanatomethyloctane-1,8-diisocyanate (nonane triisocyanate), phenylene 1,4-diisocyanate, toluene 2.4- and/or 2,6-diisocyanate (TDI), naphthylene 1,5-diisocyanate, diphenylmethane 2.2'- and/or 2,4'- and/or 4,4'-diisocyanate (MDI), 1,3- and/or 1,4-bis(2-isocyanatoprop-2-yl)benzene (TMXDI), 1,3-bis(isocyanatomethyl)benzene (XDI), alkyl 2,6-diisocyanatohexanoates (lysin diisocyanates) with alkyl groups having 1 to 8 carbon atoms, and mixtures thereof. Suitable building blocks of component D further include modifications such as, for instance, compounds containing allophanate, uretdione, urethan, isocyanurate, biuret, iminooxadiazinedione or oxadiazinetrione structure, and based on the stated disocyanates, and also polycyclic compounds such as, for example, polymeric MDI (pMDI), and also combinations of all of these.

Particular preference is given to using blocked diisocyanates based on HDI and IPDI.

The isocyanate groups are partially or wholly blocked, and so are unable to react directly with an isocyanate-reactive group. This ensures that the reaction takes place only at a particular temperature (blocking temperature).

Typical blocking agents are in the prior art and are selected so that they cleave from the isocyanate group again at temperatures between 60 and 220° C., depending on compound, and only then react with the isocyanate-reactive group. Examples of typical blocking agents are caprolactam, methyl ethyl ketoxime, pyrazoles such as, for example, 3,5-dimethyl-2-pyrazole or 1-pyrazole, triazoles such as, for example, 1,2,4-triazole, diisopropylamine, diethyl malonate, diethyl amine, phenol or its derivatives, or imidazole.

Corresponding blocked isocyanates are available commercially, among the Desmodur© brands from Covestro, for example. Particularly preferred are blocked polyisocyanates based on isophorone diisocyanate and hexamethylene diisocyanate, as are available under the designation Desmodur® PL 340 and 350 from Covestro.

Modified polyisocyanates used are preferably uretdiones, examples being the commercially available Vestagon® products from Evonik.

The amount of component D based on the overall coating composition is generally 5-20 wt %.

Component E

As component E, the hybrid material optionally comprises one or more, preferably one, monomer(s), oligomer(s) and/or polymer(s) having one or more, preferably at least two, free epoxy groups.

Preferred as component E are di- and triglycidyl ethers and esters. Particularly preferred are 4,4'-isopropylidenediphenoldiglycidyl ether (bisphenol A diglycidyl ether BPADGE), diglycidyl-1,2-cyclohexanedicarboxylate, 3,4-epoxycyclohexylmethyl 3,4-epoxy-cyclohexanecarboxylate, neopentyl glycol diglycidyl ether, trimethylolpropane triglycidyl ether and tris(4-hydroxyphenyl)methane triglycidyl ether, especially 4,4'-isopropylidenediphenol diglycidyl ether.

In one preferred embodiment the hybrid material comprises one or more, preferably one, monomer(s), oligomer(s) and/or polymer(s) having at least two free epoxy groups. In this case the amount of component E, based on component A1, is generally 5-25, preferably 10-20 mol %.

In a further preferred embodiment, the hybrid material, preferably the overall coating composition, contains no (0) monomer, oligomer or polymer having one or more free epoxy groups.

In preferred embodiments, the hybrid material of the invention is obtained from:
A1. one or more (preferably 1) partially hydrolysed alkoxysilanes in the formula (Ia), preferably 3-glycidyloxypropyltriethoxysilane;
A2. one or more (preferably 2 to 5) partially hydrolysed alkoxysilanes in the formula (Ib);
B1. a metal alkoxide in the formula (IIa), preferably tetra-n-butyl titanate;
C. one or more (preferably 1) oligomeric or polymeric polyols, preferably branched polyesters and/or polyethers containing hydroxyl groups, more preferably branched polyesters containing hydroxyl groups;
D. one or more (preferably 1) blocked, optionally modified polyisocyanates, preferably blocked aliphatic polyisocyanates based on isophorone diisocyanate; and
E. optionally one or more (preferably 1) monomers, oligomers and/or polymers which have one or more, preferably at least two, free epoxy groups, preferably di- and/or triglycidyl ethers and/or esters, more preferably 4,4'-isopropylidenediphenol diglycidyl ether.

Preference here is given to embodiments in which component E consists of one or more (preferably 1) monomers, oligomers and/or polymers which have one or more, preferably at least two, free epoxy groups, preferably di- and/or triglycidyl ethers and/or esters, more preferably 4,4'-isopropylidenediphenol diglycidyl ether.

Additionally preferred are those of the stated embodiments which contain no component E.

In the stated embodiments, component A2 comprises preferably at least one trialkoxysilane (n=3), preferably at least one trialkoxysilane in which $R^5$ is $C_1$-$C_8$ alkyl, preferably methyl or hexyl, phenyl or 3-aminopropyl, and more preferably at least three different trialkoxysilanes in which $R^5$ is in each case $C_1$-$C_8$ alkyl, preferably methyl or hexyl, phenyl or 3-aminopropyl.

In another preferred embodiment, component A2 comprises at least one tetraalkoxysilane (n=4), preferably tetraethoxysilane, and also at least one trialkoxysilane (n=3), preferably at least one trialkoxysilane in which $R^5$ is $C_1$-$C_8$ alkyl, preferably methyl or hexyl, phenyl or 3-aminopropyl, and more preferably at least three different trialkoxysilanes in which $R^5$ is in each case $C_1$-$C_8$ alkyl, preferably methyl or hexyl, phenyl or 3-aminopropyl.

II. Colorants

As well as the hybrid material, the coating composition of the invention optionally comprises one or more colorants.

In one preferred embodiment the coating composition of the invention comprises one or more, preferably 1 to 3, colorants.

In another preferred embodiment the coating composition of the invention contains no (0) colorant.

Colorants added in order to achieve different colour effects in the coating composition of the invention are pigments (organic and inorganic, coloured inorganic ions or coloured complexes, effect pigments) or soluble dyes. Examples representing the multiplicity of pigments present on the market, from the range of BASF SE, include effect pigments Black Olive™>, mica-based effect pigments, Dynacolor® pearlescent pigments, Firemist® pigments based on borosilicate, Glacier™ Frost White, Graphitan® black graphite pigment, Lumina® mica-based effect pigments, Lumina® Royal mica-based effect pigments, MagnaPearl® pearlescent pigments, Mearlin® pearlescent pigments, Mearlite® lustre pigments, Metasheen® vacuum-metallized aluminium pigments, aluminium pigment paste, e.g. Hydrolan, Paliocrom® effect pigments, Paliocrom® Brilliant effect pigments, Santa Fe™ colour effect pigments, or others, such as, for example, Chromaflow white, coloured and gold pigments, Timrex KS4, Aerosil® 200 and Iriodin® 299 or comprising Timrex® KS4, Aerosil® 200, mica effect pigment, for example Royal Gold 323, carbon black pigments, such as 200 PWD, carbon black pigment paste and lustre copper, for example Iriodin® 532. Metal complex dyes are, for example, anionic chromium and cobalt complexes of azo dyes. The cation is, for example, either a sodium ion or a substituted ammonium ion. Substituted soluble phthalocyanines likewise belong in this category.

Examples of organic azo pigments are: monoazo yellow and monoazo orange, naphthol, naphthol AS, azo colour lakes, benzimidazolone and organometallic complexes.

Examples of organic polycyclic pigments are: phthalocyanine, quinacridone, perylene and perinone, thioindigo, anthraquinone, dioxazine, isoindolinone and isoindoline, diketo-pyrrolopyrrol (DPP), triarylcarbonium and quinophthalone.

Examples of inorganic pigments are: iron oxide, chromium oxide green, ultramarine blue, Prussian blue, phthalochrome green, various mixed metal oxides Bi vanadate, manganese oxide (MnO). Examples of dyes include anthraquinone dyes, azo dyes, dioxazine dyes, indigo dyes, nitro and nitroso dyes, phthalocyanine dyes, sulfur dyes and triphenylmethane dye. Specific examples are Congo red, methyl orange, rhodamine B or methyl red.

The colorants needed for 50 ml of coating solution depend on the desired intensity of the colour and range from 0.1 to 20 g, preferably between 1 and 15 g, more preferably between two and 12 g.

The amount of colorant II, based on the overall coating composition, is generally 0.1-40 wt %.

III. Adjuvants

The coating composition of the invention optionally comprises one or more adjuvants.

In one preferred embodiment the coating composition of the invention comprises one or more, preferably 1 to 10, adjuvants. In this case, the amount of adjuvants, based on the overall coating composition, is generally 0.1 to 10 wt %, preferably 1 to 5 wt %.

In another preferred embodiment the coating composition of the invention contains no (0) adjuvant.

Preferred adjuvants are dispersants for the colorant or colorants and also commercial additives for adapting the rheology, especially wetting assistants and flow control assistants, of the kind sold in a wide variety of different configurations by Byk, for example. An example of a dispersant is Tego Dispers 670; examples of additives for adapting the rheology are Tego Glide 100. Furthermore, for improving the UV stability, it is possible to add UV stabilizers such as, for example, Eversorb 40, Eversorb 81 and/or Eversorb 95. Further possible adjuvants are nanoparticles (e.g. $SiO_2$, $TiO_2$, Al2O3, AlOOH, ZnO, $B_2O_3$, $ZrO_2$, talcs, mica), which may be added, for example, in amounts of 0.1-40 wt %, based on the overall coating composition, in order to establish mechanical and optical properties.

Besides the fraction of alcohol(s) resulting from the synthesis, originating from the partial hydrolysis, the coating composition of the invention optionally comprises one or more further diluents. The amount of diluents (alcohol(s) and any further diluents), based on the overall coating composition, is generally 20-80 wt %.

Individual components of the coating composition of the invention are commonly used already in a diluent. For instance, during production of the coating composition of the invention, the oligomers or polymers are generally used in a diluent, for example one or more solvents such as alcohols, glycols, esters and/or aromatic solvents. Preferred examples are glycol monoether acetates, such as propylene glycol monomethyl ether acetate (PGMEA, 1-methoxy-2-propyl acetate).

For producing the coating solutions, moreover, commercial solvents are generally also added to the base solution composed of components I to III, for establishing the appropriate viscosity; these commercial solvents are as described, for example, in technical handbooks for coating materials. Examples of such solvents are aliphatic alcohols, aliphatic esters, alcohols containing alkoxy groups such as, for example, 1-methoxy-2-propanol, ketones, including substituted representatives, such as, for example, butyl acetate or xylene or else mixtures of these.

The added amounts per 50 ml of coating composition are between 5 and 200 ml, preferably between 10 and 100 ml and more preferably between 10 and 20 ml.

The coating composition of the invention is produced advantageously in a plurality of stages.

First of all the partial hydrolysate (starting components Al and optionally A2) is prepared. The partial hydrolysis may be carried out under acidic or basic catalysis or in a neutral medium. Preference is given to acidic catalysis, in which case one or more acids are used, for example hydrochloric acid, sulfuric acid, phosphoric acid, nitric acid or organic acids such as acetic acid. In one preferred embodiment the partial hydrolysis is carried out at least partially with phosphoric acid.

In one preferred embodiment the partial hydrolysate is prepared by admixing the alkoxysilanes (la and optionally Ib) with water in a molar ratio of 7.5:1-1:1.5, preferably in a ratio of 5:1-1:1 and more preferably in a ratio of 1:1, and stirring them intensely preferably at room temperature. Times of between 8 and 16 hours, more preferably 12 hours, have emerged as being advantageous.

The preparation of a base solution by reaction of the starting components Al and optionally A2 with components 1 and optionally B2 takes place in general by mixing at temperatures between preferably −10° C. and 0° C., with particular preference being given to the ice bath, at 0° C.

Mixing is accomplished preferably by adding the metal alkoxide solution of components 1 and optionally B2 with stirring to the primarily hydrolysate of the alkoxysilane (Al and optionally A2) in a molar ratio of 0.1:1-1:1, preferably 0.2:1-0.7:1, more particularly 0.3:1-0.6:1.

The stirring time and hence the duration of homogeneous mixing is in general between 1 and 3 hours, preferably between 1 and 2 hours, more preferably 90 minutes.

In order to complete the reaction, between 3 to 100 ml, preferably 3 to 50 and more preferably 4 to 4.5 ml of distilled water per 50 ml of reaction solution are added dropwise, with stirring for an additional one to five, preferably 2 hours (base solution).

Added to the resulting mixture of components Al and optionally A2 with components 1 and optionally B2, as component C, is an oligomeric or polymeric polyol, for example a polyvinyl alcohol or polyester alcohol. The molar ratio of alkoxysilanes (la and optionally Ib) to polyol is generally 2: 1-1:2.

The coating composition comprises blocked, optionally modified isocyanates as component D. Component D is added typically with stirring to the solution of components A, B and C.

Here, the ratio of free hydroxyl groups in the polyol to NCO groups is in general 5:1 to 1:1, preferably 2.5:1 to 1:1, more particularly 1.2:1 to 1:1.

It is possible optionally for the mixture described to be admixed with, as component E, one or more monomers, oligomers and/or polymers which have at least two free epoxy groups.

The reaction is completed by subsequent stirring, typically for between 1 and 3 h.

For producing coating solutions, commercial solvents are generally also added as diluent to the base solution, for establishing the appropriate viscosity; these commercial solvents are as described, for example, in technical handbooks for coating materials. Examples of such solvents are aliphatic alcohols, aliphatic esters, alcohols containing alkoxy groups such as, for example, 1-methoxy-2-propanol, ketones, including substituted representatives, such as, for example, butyl acetate or xylene or else mixtures of these.

The amounts added per 50 ml of coating composition are between 5 and 200 ml, preferably between 10 and 100 ml and more preferably between 10 and 20 ml.

The base solution is additionally admixed optionally with the adjuvants III, examples being commercial additives for adapting the rheology, especially wetting assistants and flow control assistants.

Moreover, in order to achieve various colour effects, the base solution is admixed optionally with colorants II, examples being pigments (organic and inorganic, coloured inorganic ions or coloured complexes, effect pigments) or soluble dyes.

The method of the invention for producing a coated substrate comprises the steps of
a) wet-chemically applying the coating composition of the invention to the substrate, and
b) thermally curing the coating composition.

The wet-chemical applying (step a)) of the coating composition may take place via the customary wet-chemical coating techniques known to the skilled person, e.g. spraying, electrostatic spraying, dipping, pouring, spin-coating, roll application, spreading, knifecoating or curtain coating. Printing methods can also be used, for example, such as screen printing, for example. Preference is given to application by spraying—for example, to bright-anodized trim strips.

The coating composition applied to the substrate is normally cured at temperatures of 80 to 240° C., preferably 120 to 230° C., more preferably at 150 to 220° C., very preferably at 180 to 210° C., more particularly 170 to 190° C. (step b)). Where curing includes a first drying step, this step is generally carried out at a temperature of 80 to 120° C., followed by the further curing in general at temperatures of 160 to 240° C.

Curing may be accomplished by any desired manner of heat supply (ambient temperature, infrared radiation, microwave radiation). In the case of conventional heat supply, in an oven, for example, the curing time is between 2 and 120 minutes, more preferably between 5 and 15 minutes, more particularly 12 minutes (at temperatures of 180 to 210° C.).

Microwave curing takes place with standard commercial equipment, and the cure time is in general between 5 and 20 minutes, more preferably between 5 and 15 minutes.

In the case of an anodized surface, temperatures up to around 160° C. and cure times of around 1 h are generally employed. Thermal consolidation may also take place, optionally, by means of IR or NIR radiation.

The film thicknesses obtained by the method of the invention are in general in the range from 3 to 15 μm.

Substrate

The coating composition of the invention and the method of the invention serve for the production of decorative and protective coatings on surfaces and substrates, with the term substrate, in accordance with the invention, encompassing surfaces. Preferred are metal, glass and plastics substrates. Particularly preferred substrate materials comprise aluminium and its alloys, anodized aluminium, carbon steel, steel and its alloys, stainless steel, copper alloys, brass alloys and bronze. In a further embodiment, the substrate may also be made of glass or plastic.

Among preferred substrates are light-metal substrates. Light metals in the sense of the invention are metals and alloys having a density below 5 g/cm$^3$. Preferred are Al, Mg and Ti and their alloys; particularly preferred is Al and its alloys, particularly those with the elements Mn, Mg, Cu, Si, Ni, Zn and Be. The designation of aluminium alloys is in line with EN 573-3/4.

In another preferred embodiment, the substrate is an unanodized aluminium substrate.

In another embodiment, the substrate is an anodized aluminium substrate.

The substrate coated with the coating composition of the invention may be a semi-finished product, such as plates, sheets, tubes, rods or wires, a structural component or a finished product. It may be used, for example, for plants, tools, household appliances such as irons, electrical components, switches, machines, vehicle and aircraft parts, especially automotive components, luggage items such as suitcases, housings, production plants, architectural facings, heat exchangers or parts thereof.

The coatings are especially suitable for metallic substrates, examples being aluminium substrates, such as metal housings of electronic equipment, components for optical instruments, parts of vehicles, both interior and exterior, components in mechanical engineering and plant construction, engines, components of medical appliances, components of household appliances, other electrical appliances and turbines, domestic appliances, architectural facing components, components of lifts, parts of conveying installations, parts of furniture, handles, seat parts, especially for vehicles and aircraft, garden appliances, agricultural machines, fittings, engine components and production plants in general. In addition they may find applications in the decorative sector, for fashion jewellery, for example.

The invention is elucidated further by the examples which follow, which are not intended to have any limiting effect whatsoever.

EXAMPLES

Example 1

Basecoat:

244 mmol of 3-glycidyloxypropyltriethoxysilane were stirred with 6.60 g of 1M phosphoric acid and cooled to 10° C. Thereafter 50 mmol of orthobutyl titanate (titanium tetra-n-butoxide) were added, after which stirring took place and further cooling to 10° C. The dropwise addition of 220 mmol of water was followed by further stirring.

Subsequently 500 mmol of propylene glycol monomethyl ether acetate (PGMEA), 191 mmol of branched polyester containing hydroxyl groups (Desmophen D651 MPA/X) and 51 mmol of blocked aliphatic polyisocyanates based on isophorone diisocyanate (Desmodur PL340 BA/SN) were added, with subsequent stirring.

Production of a Silver-Coloured Paint:

244 mmol of 3-glycidyloxypropyltriethoxysilane were stirred with 6.60 g of 1M phosphoric acid and cooled to 10° C. Thereafter 50 mmol of orthobutyl titanate were added, after which stirring took place and further cooling to 10° C. The dropwise addition of 220 mmol of water was followed by further stirring.

Subsequently 500 mmol of PGMEA, 191 mmol of branched polyester containing hydroxyl groups (Desmophen D651 MPA/X) and 51 mmol of blocked aliphatic polyisocyanates based on isophorone diisocyanate (Desmodur PL340 BA/SN) were added, with subsequent stirring. This was followed by the addition of 100.0 g of PGMEA, 5.0 g of surface additives and rheological additives (Tego Dispers 6700 and Glide 100), 8.3 g of aluminium pigment paste (Hydrolan STAPA S2100), 20.8 g of mother-of-pearl pigment (Magnapearl 3100) and 8.0 g of yellow and white pigment paste, with subsequent stirring.

The coating composition from Example 1 was applied via spray coating with a robot to unanodized precleaned aluminium components. The film thickness was established at 12 μm. The coating was cured without preliminary drying at a temperature of 160° C. for 60 minutes in a forced air oven. The silver-coloured films obtained meet the desired requirements.

Example 2

Production of Basecoat:

132 mmol of 3-glycidyloxypropyltriethoxysilane were introduced with 101 mmol of methyltrimethoxysilane, 31 mmol of tetraethoxysilane, 39 mmol of phenyltriethoxysilane and 13 mmol of hexyltrimethoxysilane, 5.79 g of 1M phosphoric acid were added, and the mixture was stirred and cooled to 10° C.

Thereafter 63 mmol of orthobutyl titanate were added, followed by further stirring and additional cooling to 10° C. 463 mmol of water were added dropwise to this mixture, with further stirring. Added subsequently were 624 mmol of PGMEA, 104 mmol of branched polyesters containing hydroxyl groups (Desmophen D651 MPA/X), 28 mmol of blocked aliphatic polyisocyanates based on isophorone diisocyanate (Desmodur PL340 BA/SN), 18 mmol of 4,4'-isopropylidenediphenol diglycidyl ether, 10 mmol of 3-glycidyloxypropyltriethoxysilane and 5 mmol of 3-aminopropyltriethoxysilane, after which the mixture was stirred.

Production of a Bronze-Coloured Paint:

132 mmol of 3-glycidyloxypropyltriethoxysilane were introduced with 101 mmol of methyltrimethoxysilane, 31 mmol of tetraethoxysilane, 39 mmol of phenyltriethoxysilane and 13 mmol of hexyltrimethoxysilane, 5.79 g of 1M phosphoric acid were added, and the mixture was stirred and cooled to 10° C.

Thereafter 63 mmol of orthobutyl titanate were added, followed by further stirring and additional cooling to 10° C. 463 mmol of water were added dropwise to this mixture, with further stirring. Added subsequently were 624 mmol of PGMEA, 104 mmol of branched polyesters containing hydroxyl groups (Desmophen D651 MPA/X), 28 mmol of blocked aliphatic polyisocyanates based on isophorone diisocyanate (Desmodur PL340 BA/SN), 18 mmol of 4,4'-isopropylidenediphenol diglycidyl ether, 10 mmol of 3-glycidyloxypropyltriethoxysilane and 5 mmol of 3-aminopropyltriethoxysilane, after which the mixture was stirred.

Added subsequently were 38.0 g of PGMEA, 5.5 g of surface additives and rheological additives (Tego Dispers 6700 and Glide 100), 22.63 g of mica effect pigment (Royal Gold 323), 1.13 g of Carbon Black Pigment (200 PWD), and the mixture was subsequently stirred.

Example 3

103 mmol of 3-glycidyloxypropyltriethoxysilane were introduced with 79 mmol of methyltrimethoxysilane, 24 mmol of tetraethoxysilane, 31 mmol of phenyltriethoxysilane and 11 mmol of hexyltrimethoxysilane, 4.53 g of 1M phosphoric acid were added, and the mixture was subsequently stirred and cooled to 10° C.

Thereafter 49 mmol of orthobutyl titanate were added, with subsequent stirring and further cooling to 10° C. Added dropwise to this mixture were 363 mmol of water, with subsequent stirring. Subsequently 470 mmol of acetone, 282 mmol of isopropylideneglycerol, 54.2 g of branched polyester containing hydroxyl groups (Plusodur V730S), 66 mmol of blocked aliphatic polyisocyanates based on isophorone diisocyanate (Desmodur PL340 BA/SN), 14 mmol of 4,4'-isopropylidenediphenol diglycidyl ether, 8 mmol of 3-glycidyloxypropyltriethoxysilane and 4 mmol of 3-aminopropyltriethoxysilane were added and the mixture was subsequently stirred.

Production of a High-Gloss Black Paint:

103 mmol of 3-glycidyloxypropyltriethoxysilane were introduced with 79 mmol of methyltrimethoxysilane, 24 mmol of tetraethoxysilane, 31 mmol of phenyltriethoxysilane and 11 mmol of hexyltrimethoxysilane, 4.53 g of 1M phosphoric acid were added, and the mixture was subsequently stirred and cooled to 10° C.

Thereafter 49 mmol of orthobutyl titanate were added, with subsequent stirring and further cooling to 10° C. Added dropwise to this mixture were 363 mmol of water, with subsequent stirring.

Subsequently 470 mmol of acetone, 282 mmol of isopropylideneglycerol, 54.2 g of branched polyester containing hydroxyl groups (Plusodur V730S), 66 mmol of blocked aliphatic polyisocyanates based on isophorone diisocyanate (Desmodur PL340 BA/SN), 14 mmol of 4,4'-isopropylidenediphenol diglycidyl ether, 8 mmol of 3-glycidyloxypropyltriethoxysilane and 4 mmol of 3-aminopropyltriethoxysilane were added and the mixture was subsequently stirred.

Added subsequently were 50.0 g of acetone, 69.0 g of isopropylideneglycerol, 4.0 g of surface additives and rheological additives (Tego Dispers 6700 and Glide 100) and also 30.0 g of carbon black pigment paste, and the mixture was subsequently stirred.

Example 4

173 mmol of 3-glycidyloxypropyltriethoxysilane were introduced with 133 mmol of methyltrimethoxysilane, 40 mmol of tetraethoxysilane, 51 mmol of phenyltriethoxysilane and 18 mmol of hexyltrimethoxysilane. Added to this were 7.59 g of 1M phosphoric acid, followed by subsequent stirring and cooling to 10° C. Thereafter 82 mmol of orthobutyl titanate were added, with subsequent stirring and further cooling to 10° C. Added dropwise to this mixture were 606 mmol of water, with subsequent stirring.

Added subsequently were 434 mmol of PGMEA, 19.33 g of trifunctional polypropylene ether polyol (Desmophen D1380BT), 28 mmol of blocked aliphatic polyisocyanates based on isophorone diisocyanate (Desmodur PL340 BA/SN), 24 mmol of 4,4'-isopropylidenediphenol diglycidyl ether, 14 mmol of 3-glycidyloxypropyltriethoxysilane and 7 mmol of 3-aminopropyltriethoxysilanes, with subsequent stirring.

The invention claimed is:

1. A coating composition comprising
   I. an inorganic-organic hybrid material obtained from
      A1. one or more partially hydrolysed alkoxysilanes of the formula (Ia), $(R^1O)_n SiR^2{}_{3-n} R^3$     (Ia)

where the symbols and indices have the following definitions:
      $R^1$ is $C_1$-$C_6$ alkyl or $C_1$-$C_{10}$ aryl,
      $R^2$ is $C_1$-$C_4$ alkyl, $C_2$-$C_4$ alkenyl or $C_2$-$C_4$-alkynyl, $C_6$-$C_{10}$ aryl, $C_6$-$C_{10}$ aralkyl or $C_6$-$C_{10}$ alkaryl,
      $R^3$ is an epoxy-functional group and
      n is 1, 2 or 3;
      A2. optionally one or more partially hydrolysed alkoxysilanes of the formula (Ib), $(R^4O)_n SiR^5{}_{4-n}$     (Ib)

where the symbols and indices have the following definitions:
      $R^4$ is $C_1$-$C_6$ alkyl or $C_6$-$C_{10}$ aryl,
      $R^5$ is $C_1$-$C_{10}$ alkyl, $C_2$-$C_4$ alkenyl or $C_2$-$C_4$ alkynyl, $C_6$-$C_{10}$ aryl, $C_6$-$C_{10}$ aralkyl or $C_6$-$C_{10}$ alkaryl, the stated radicals being optionally substituted by one or more amino group(s), and n is 1, 2, 3 or 4;

B1. one or more metal alkoxides of the formula (IIa),

 (IIa)

where the symbols have the following definitions:

$R^6$ is $C_1$-$C_6$ alkyl or $C_6$-$C_{10}$ aryl;

B2. optionally one or more metal alkoxides of the formula (IIb),

 (IIb)

where the symbols and indices have the following definitions:

M is a metal from main or transition group 3 or 4 with EN<1.5 except for Ti, $R^7$ is $C_1$-$C_6$ alkyl, or $C_6$-$C_{10}$ aryl and m is 0 or 1, where the molar ratio of Si in component A1 and A2 to Ti in component 1 is 1-20:1;

C. one or more oligomeric or polymeric polyols;

D. one or more blocked, optionally modified polyisocyanates; and

E. optionally one or more monomers, oligomers and/or polymers which have one or more free epoxy groups;

II. optionally one or more colorants and

III. optionally one or more adjuvants.

2. The coating composition according to claim 1, comprising a compound (Ia) for which the symbols and indices in the formula (Ia) have the following definitions:

$R^1$ is $C_1$-$C_4$ alkyl, $R^3$ is 3-glycidyloxypropyl and n is 3.

3. The coating composition according to claim 1, comprising one or more compounds of the formula (Ib).

4. The coating composition according to claim 1, wherein the partial hydrolysis of the compound of the formula (I) took place in an acidic medium.

5. The coating composition according to claim 1, wherein the compound (IIa) is titanium tetra-n-butoxide.

6. The coating composition according to claim 1, wherein the symbols and indices of the formula (IIb) have the following definitions:

M is Al, Zr, or B;

$R^7$ is $C_1$-$C_6$ alkyl and m is 0 or 1.

7. The coating composition according to claim 1, wherein component E comprises one or more di- or triglycidyl ethers or di- or triglycidyl esters.

8. The coating composition according to claim 1, wherein the component C used comprises a branched polyester polyol.

9. The coating composition according to claim 1, wherein the component D used comprises one or more blocked polyisocyanates based on isophorone diisocyanate or hexamethylene diisocyanate.

10. A method for producing a coated substrate, comprising the steps of a) wet-chemically applying a coating composition according to claim 1 to the substrate, and b) thermally curing the coating composition.

11. The method according to claim 10, wherein the curing time is in the range from 2 minutes to 2 hours.

12. The method according to claim 10, wherein the thermal curing in step b) takes place at a temperature in the range from 80 to 240° C.

13. The method according to claim 10, wherein the substrate is a metal, glass, or plastic.

14. A substrate, chosen from the group consisting of metal, glass, and plastics, coated with a coating composition according to claim 1.

15. The coating composition according to claim 1, wherein m is 1.

16. The coating composition according to claim 2, wherein the compound of formula (Ia) is 3-glycidyloxypropyltrimethoxysilane and/or 3-glycidyloxypropyltriethoxysilane.

17. The coating composition according to claim 4, wherein the partial hydrolysis of the compound of the formula (I) took place with addition of phosphoric acid.

18. The coating composition according to claim 3, wherein the one or more compounds of the formula (Ib) are selected from the group consisting of tetraethoxysilane, methyltriethoxysilane, hexyltriethoxysilane, phenyltriethoxysilane, aminopropyltriethoxysilane and mixtures of two or more of the stated compounds.

19. The coating composition according to claim 7, wherein the diglycidyl ether is 4,4'-isopropylidenediphenol diglycidyl ether.

20. The method according to claim 13, wherein the substrate is an aluminium substrate.

21. The substrate of claim 14, wherein the substrate is an aluminium substrate.

* * * * *